United States Patent [19]
Moczygemba et al.

[11] Patent Number: 5,869,908
[45] Date of Patent: Feb. 9, 1999

[54] KEY/VEHICLE COMMUNICATION DEVICE FOR THE ACTIVATION OF AN IMMOBILIZER AND OF A REMOTELY CONTROLLABLE FUNCTION

[75] Inventors: Jürgen Moczygemba, Lichtenstein; Martin Lindmayer, Sulz-Hopfen, both of Germany

[73] Assignee: Mercedes-Benz AG, Germany

[21] Appl. No.: 738,764

[22] Filed: Oct. 28, 1996

[30] Foreign Application Priority Data

Oct. 26, 1995 [DE] Germany .................. 195 39 851.3

[51] Int. Cl.$^6$ .................................................. B60R 25/04
[52] U.S. Cl. ........................................... 307/10.5; 180/287
[58] Field of Search ..................... 307/9.1, 10.6; 180/287, 289; 70/264; 340/425.5, 426, 825.3–825.32, 825.69, 825.72, 825.54

[56] References Cited

U.S. PATENT DOCUMENTS

| | | | |
|---|---|---|---|
| 4,818,855 | 4/1989 | Mongeon et al. | 340/825.54 |
| 5,247,279 | 9/1993 | Sato | 340/426 |
| 5,561,420 | 10/1996 | Kleefeldt et al. | 340/825.54 |

FOREIGN PATENT DOCUMENTS

| | | |
|---|---|---|
| 42 38 042 A1 | 5/1994 | Germany . |
| 43 40 260 A1 | 4/1995 | Germany . |
| 19500999C1 | 1/1996 | Germany . |
| 72 069 | 7/1991 | Japan . |
| 294 209 | 11/1993 | Japan . |
| 296 129 | 11/1993 | Japan . |
| 2 291 242 | 6/1994 | United Kingdom . |
| 2 289 719 | 5/1995 | United Kingdom . |

OTHER PUBLICATIONS

Search Report Dated Jan. 20, 1997.

*Primary Examiner*—Richard T. Elms
*Attorney, Agent, or Firm*—Evenson, McKeown, Edwards & Lenahan, P.L.L.C.

[57] ABSTRACT

The invention provides a key/vehicle communication device in which an electronic key capable of being inserted into a steering-column lock controls activation of an immobilizing device having an inductive key/steering-column lock communication channel for recognizing whether a key authorized for use is inserted. A key/vehicle communication channel is also provided, for the remotely controllable activation of at least one vehicle-side function via a key-side actuating member. A vehicle-side control unit determines, via the inductive key/steering-column lock communication channel, whether a key authorizing the driving of a vehicle is inserted in the steering-column lock and, if so, blocks the vehicle-side part of the key/vehicle communication channel.

6 Claims, 1 Drawing Sheet

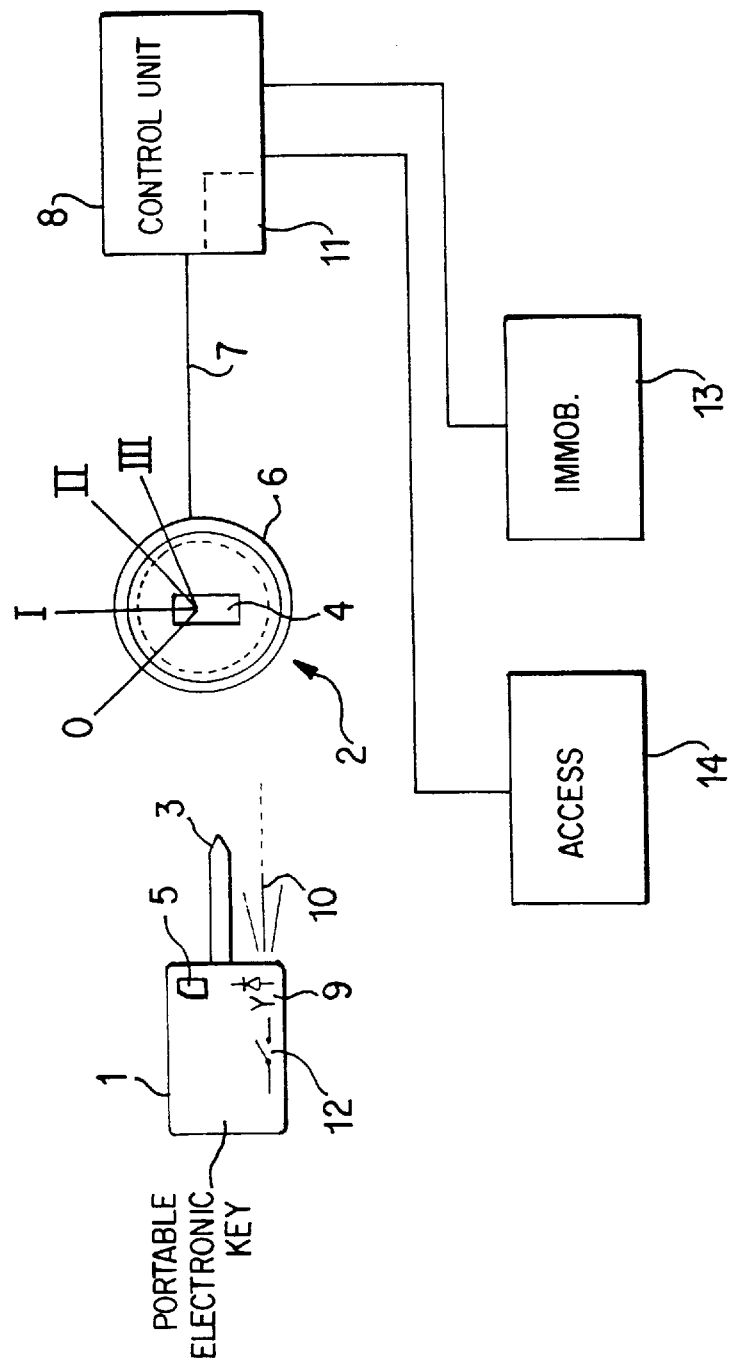

5,869,908

KEY/VEHICLE COMMUNICATION DEVICE FOR THE ACTIVATION OF AN IMMOBILIZER AND OF A REMOTELY CONTROLLABLE FUNCTION

BACKGROUND AND SUMMARY OF THE INVENTION

The invention relates to a key/vehicle communication device of the type which can activate an arrangement for immobilizing the vehicle, as well as other remotely controllable functions.

Electronic immobilizers for protecting a vehicle against unauthorized use (that is against being started up without permission) are known. In such devices, the inductive key/steering-column lock communication channel constitutes a very short-range radio transmission link which deactivates the immobilizing function when the electronic key is inserted into the steering-column lock. The ensuing check of a use authorization code stored in the key confirms that the key is the one authorizing the use of the vehicle. One known embodiment of such an arrangement involves a so-called transponder which is arranged in the key, and contains the use authorization code in retrievable form.

An additional vehicle-side function, which can also be activated by remote control, may be, for example, an access protection function, such as a central locking system and/or a break-in/theft warning system, which is activated via a key/vehicle communication channel, by actuating a key-side actuating member. The range of this communication channel is designed to be greater than that of the inductive key/steering-column lock transmission link, so that the relevant function (for example, the access protection function) can be activated or deactivated at an early stage by means of a key located outside the vehicle.

German patent document DE 43 40 260 A1 discloses an ignition-key/vehicle communication device, in which a key receptacle for receiving a key contains an additional switch. When the key inserted, the switch is actuated via a tappet, and switches on inductive energy transmission for an energy store of the key. Subsequently, a use authorization check is performed by means of a bidirectional code data exchange via a key/lock communication channel with an infrared transmission link, using a changeable code for the purpose of approving the operation of an electronic key. In addition, a central locking system and/or an alarm system can be activated via a key/vehicle communication channel. The latter can also respond by remote control from outside the vehicle by means of corresponding key actuation.

In devices of this type, there is generally a risk of improper operations due inadvertent actuation of the key-side actuating member for the remotely controlled activation of a vehicle-side function (such as the access protection function, for example). Such improper operation of this kind is particularly likely to occur when the key is inserted into the ignition lock and the engine is started or stopped by turning the key, since such handling of the key may unintentionally lead to the actuation of the actuating member.

In order to decreases the risk of such unintended actuations of an opening button and a closing button arranged on an electronic vehicle key (and thereby accidentally triggering the locking or unlocking of vehicle doors by remote control), German Patent Document DE 42 38 042 A1 discloses a particular arrangement of these actuating members on the key. In particular, either the opening button is covered by a key bit articulated for swing action on the key bow part, in the swung-in state of the said key bit, or the opening and closing buttons can be operated only indirectly by pressing on the swung-in or swung-out key bit.

U.S. Pat. No. 4,383,242 discloses an ignition-key/vehicle communication device for the activation of a vehicle protection system which comprises an immobilizing function and an access protection function. The access protection function, in turn, comprises a door locking system and a break-in/theft warning system. In this device, before getting into the vehicle which has an armed protection device, the user can actuate a transmitter button on an electronic key, thereby triggering a remote-control signal which releases the door locks, disarms the break-in/theft warning system, and deactivates the immobilizing function (which otherwise disables the ignition when an attempt at unauthorized access is recognized). When the user leaves the vehicle, these three functions can be activated once again, and the protection device thus armed, by actuating the transmitter button again.

In order to avoid arming the device by unintentionally actuating the transmitter button on the key during starting of the vehicle or during its subsequent running (which, in the latter case in particular, would cause an undesirable interruption of ignition), activating signals transmitted from the key and received on the vehicle side are logically combined in an OR gate with a signal representing the state of ignition, so that the activating signals are ignored when the ignition is switched on.

The Non Prior Art

German patent document DE 195 00 999 C1 discloses a motor-vehicle protection system with an unauthorized-use protection device which allows the engine to be started only when authorizing use information is entered. In addition, an unauthorized-access protection device allows a locked door to be unlocked from outside only when authorizing access information is entered, and an additional door protection unit allows unlocking from the inside of a door which has been locked in a manner protected against unlocking from outside, only when it is in an desecured state. The latter can be changed over from the secured to the desecured state by entering authorizing inside unlocking information generated, inter alia, when the authorizing use information is entered. This ensures that, if the additional door protection has previously been secured unintentionally (for example, when an infrared or radio key is used in a steering-column lock having an ignition starter switch, an associated transmitter button is inadvertently pressed), it is desecured when starting of the engine is allowed. Thus, the communication channel belonging to the additional door protection is not blocked.

The object of the present invention is to provide a key/vehicle communication device of the type mentioned above, which is protected, at relatively low cost, against undesirable triggering of remotely activatable functions due to unintended actuation of the key-side actuating member when the key is inserted in the ignition lock.

This object is achieved by the key/vehicle communication device according to the invention, in which the recognition that an authorized key is inserted into the steering-column lock, which information is transmitted by means of the inductive key/steering-column lock communication channel, is used not only to deactivate the immobilizing function (as is customary), but also to block the vehicle segment of a second communication channel (a key/vehicle communication channel) for the remote activation of a vehicle-side function, as long as a key authorizing the driving of the vehicle is inserted in the steering-column lock.

Thus, without additional outlay in terms of switches or wiring, with the key already inserted (and not just after the key has been turned to switch the ignition on), the relevant function (that is, the access protection function in the form of a locking or unlocking of the vehicle doors by activating a central locking system and/or an activation or deactivation of a break-in/theft warning system) is prevented from being triggered accidentally by inadvertent actuation of the key-side actuating member.

A preferred embodiment of the invention has the advantage that the same control unit which evaluates the information from the inductive key/steering-column lock communication channel can both deactivate the immobilizing function and maintain the remotely activatable function in a blocked state, thereby keeping the implementation outlay particularly low.

These and other objects, features and advantages of the present invention will become more readily apparent from the following detailed description of the drawing wherein:

BRIEF DESCRIPTION OF THE DRAWINGS

The single FIGURE shows a block diagram of a key/vehicle communication device for activation of an immobilizing function and access protection functions according to the invention.

DETAILED DESCRIPTION OF THE DRAWINGS

The FIGURE represents those components of a key/vehicle communication device which are essential for understanding the invention. Those components which are shown in conceptual schematic form are conventional, and are well known to those skilled in the art.

As shown in the FIGURE, the device contains on the user's side, a portable electronic key (1) and, on the vehicle side, a steering-column lock (2). The key (1) has a mechanical key bit (3) which can be inserted into an associated receptacle (4) of the steering-column lock (2). As is customary, the inner cylinder of the steering-column lock (2) can then be rotated between the positions "0", "I", "II" and "III" by means of an inserted key (1) authorizing the driving of the vehicle. The position "0" corresponds to the inserted rest position of the key (1) in the steering-column lock (2), while in the position "I" (the so-called accessory position), the steering-column lock is unlocked and a switch is closed, connecting particular power consuming elements, such as, for example, a car radio, to the vehicle power supply. The position "II" corresponds to the switched-on ignition, and in position "III" the starter is activated.

To activate the immobilizing function (13), the device contains an inductive key/steering-column lock communication channel which comprises, on the key side, a so-called transponder (5), in which a vehicle-specific use authorization code is stored in read-out form, and, on the vehicle side, a coil (6). The coil (6) is arranged on the steering-column lock (2), surrounding the inner cylinder of the latter, and is connected via a signal line (7) to a control unit (8) arranged on the vehicle. The insertion of a key (1) into the steering-column lock (2) in the position "0" triggers an inductive data transmission process, including the use authorization code, by the transponder (5) of the key (1). This transmission is received by the coil (6) on the steering-column lock (2) and is fed via the signal line (7) to the control unit (8), where it is checked to determine whether it is authorized for the particular vehicle. (Alternatively, depending on the design requirements, such transmission may be triggered only when the key (1) is turned into the position "I" or "II" of the steering-column lock (2).) When the use authorization code, and consequently the key (1), are recognized as being authorized for use, the control unit (8) deactivates the immobilizing function (13). For this purpose, it allows the operation of one or more control instruments relevant to the driving mode, which are incorporated into the immobilizing device so that their operation is kept blocked while the immobilizing function (13) is armed. After this disarming of the immobilizing device, the vehicle can be started and run by turning the key (1), inserted into the steering-column lock (2) into the position "III".

At the end of a trip, when the engine is first stopped and the power consuming elements are then uncoupled from the vehicle power supply, the key (1) can be removed from the steering-column lock (2) by turning it back out of the position "II" into the position "I" and then the position "0". This withdrawal of the key (1) is again recognized by the control unit (8) via the inductive key/steering-column lock communication channel (5, 6, 7), whereupon the control unit automatically puts the immobilizing device (13) into the armed state.

In addition to the key/steering-column lock communication channel described above, the invention also includes a key/vehicle communication channel for activating the access protection devices (14) that are provided in addition to the above-described immobilizing device (for example, a central locking system and a break-in/theft warning system). The key/vehicle communication channel comprises a transmitter unit (9) on the key itself, and a receiver unit (11), which is contained in the vehicle and integrated into the control unit (8), as well as an associated infrared or a radio data transmission link (10). The transmitter unit (9) can be activated by means of an operating button (12) arranged on the housing of the key (1), whereupon it emits a signal which is received by the receiver unit (11). This signal contains a control demand which induces the control unit (8), in which the receiver unit (11) is integrated, to execute a corresponding activation or deactivation of the relevant access protection function (14) (that is, the locking or unlocking of the vehicle doors via the central locking system and the arming or disarming of the break-in/theft warning system).

In contrast to the inductive data transmission link, the range of the infrared or radio data transmission link (10) is sufficient to permit the activating commands to be effectively transmitted from the key (1) to the vehicle-side control unit (8) from outside the vehicle, as is necessary for operation of the access protection devices (14). Thus, the doors can be unlocked and the break-in/theft warning system disarmed for the purpose of getting into the vehicle or the doors can be locked and the break-in/theft warning system armed after getting out of the vehicle. Moreover, it can also be provided that the immobilizing function (13) can be activated by remote control via the key/vehicle communication channel (9, 10, 11), as well as by the inductive key/steering-column lock communication channel (5, 6, 7), as noted previously.

The remotely controllable key/vehicle communication channel (9, 10, 11) is, of course, operational even when the electronic key (1) is already within the vehicle interior, and it thus is possible that the actuating button (12) may be pressed inadvertently, activating the transmitter unit (9) particularly when the key (1) is being turned in the steering-column lock (2). However, it is frequently undesirable to activate functions such as the central locking system and/or the break-in/theft warning system (which are of course triggered by such inadvertent actuation, absent appropriate protective measures) when the operator intends to drive the vehicle, and in the stationary mode when the vehicle occupant would like to remain in the vehicle for a short while. This consideration is even more important when, as indicated above, the immobilizing function can also be activated by remote control via this key/vehicle communication channel (9, 10, 11), in which case unintended pressing of the actuating button (12) on the key (1) could result in an undesired activation of the immobilizing function (13) (following an earlier deactivation and the subsequent turning of the key (1) into the position "II" for switched-on ignition). In order to prevent such an occurrence, according to the invention, the control unit (8) performs an error protection function with respect to activation of those functions which are capable of being influenced per se by remote control via the key/vehicle communication channel (9, 10, 11).

The error protection function is performed by using the inductive key/steering-column lock communication channel (5, 6, 7) to recognize a key (1) inserted in the steering-column lock (2) to authorize the driving of the vehicle. The control unit (8) recognizes when the ignition is switched on (that is, a key (1) authorizing the driving of the vehicle is inserted in the position "II" in the steering-column lock (2)), via the inductive key/steering-column lock communication channel (5, 6, 7) or, in this state, alternatively also via an existing ignition-lead signal. Thereupon, the control unit (8) disables the receiver unit (11), maintaining those functions (14) which can be activated via the key/vehicle communication channel (9, 10, 11), (that is, the central locking function, the break-in/theft warning system function and, if appropriate, the immobilizing function (13)) in a blocked state. Alternatively, execution of the activating commands transmitted by the key (1) via the key/steering-column lock communication channel (9, 10, 11) can be blocked by interrupting a segment of the activating-command signal transmission path downline of the receiver unit (11). For example, when the ignition is recognized as being switched on, the control unit (8) can be programmed to ignore an activating-command signal duly received by the receiver unit (11).

As soon as the ignition is switched off by turning the key (1) back correspondingly in the steering-column lock (2), the control unit (8) inquires, via the connecting line (7) and the coil (6), whether the key (1) is still inserted in the steering-column lock (2). In one embodiment, this interrogation is carried out by the cyclic interrogation of the code which is stored in the transponder (5) of the key (1), transmitted inductively by the transponder (5) to the steering-column lock coil (6), and transferred from the latter via the connecting line (7) to the evaluating control unit (8). When the ignition is switched-on, if the code authorizing the driving of the vehicle is recognized the control unit (8) continues blocking of the function of the key/steering-column lock communication channel (9, 10, 11) for the remotely controlled activation of the access protection devices (14) on the vehicle side (and, if appropriate, of the immobilizing device). In a second embodiment, the inductive key/steering-column lock communication channel (5, 6, 7) is designed so that in response to the transponder (5) in the key (1), the inductive field on the steering-column lock coil (6) assumes different specific states which can be sensed by the coil (6) and received and evaluated by the control unit (8), depending on whether the key (1) is inserted into the steering-column lock (2) or not. To reduce current consumption, the interrogation regarding the insertion of a key (1) into the steering-column lock (2), and authorizing the driving of the vehicle, is switched off after a predetermined period of time, for example after 30 minutes.

The control unit (8) recognizes when the key (1) is withdrawn from the steering-column lock (2), via the inductive key/steering-wheel lock communication channel (5, 6, 7). Specifically, in the first embodiment (above), the interrogated use authorization codes from the key-side transponder (5) cease; while in the second embodiment the inductive field in the region of the steering-column lock coil (6) collapses because the transponder (5) has departed. In response to the recognition that the key (1) has been removed from the steering-column lock (2), the control unit (8) terminates the vehicle-side blocking of the functions (14) which can be influenced by remote control via the key/steering-column lock communication channel (9, 10, 11), so that these functions can subsequently be activated normally by pressing the actuating button (12) on the key (1).

The above description of one of many possible implementations of the invention makes it clear that, according to the invention, the inductive key/steering-column lock communication channel, used for automatic activation of an immobilizing device, is also used to recognize whether a key authorizing the driving of the vehicle is inserted in the steering-column lock, and if appropriate, also in a position of rest with the ignition switched off. This arrangement ensures blocking of the activation of one or more remote-control functions, particularly those of an access protection device and/or of an immobilizing device, which can otherwise be remotely activated by actuation of the key-side actuating member. The invention thus provides, without further outlay in terms of switches and wiring, reliable protection against improper operation due to unintended triggering of these functions when the key is inserted in the steering-column lock.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A key/vehicle communication arrangement for a vehicle having a vehicle immobilizing device, at least one remotely actuatable vehicle function and a control unit for actuating said vehicle immobilizing device and said remotely actuatable vehicle function, said arrangement comprising:

a key unit which is insertable into a steering column lock of said vehicle;

a key/steering column lock communication channel for detecting when a key authorized for use in said vehicle is presently inserted into the steering column lock, and for causing deactivation of said immobilizing device in response thereto;

a key/vehicle communication channel for causing activation of said remotely actuatable vehicle function in response to actuation of an actuating member on said key unit;

wherein when said key/steering column communication channel detects that a key authorized for use in said vehicle is presently inserted into said steering column lock, said control unit disables said key/vehicle communications channel.

2. Arrangement according to claim 1, wherein:

said key/vehicle communication channel comprises a data transmission unit which provides a data transmission link to a receiver unit of the control unit; and wherein said control unit disables said key/vehicle communication channel by interrupting said data transmission link.

3. Arrangement according to claim 1, wherein said control unit is programmed to ignore an activation-command signal transmitted via said key/vehicle communication channel in response to said key/steering column lock communication channel detecting a key authorized for use in said vehicle.

4. Arrangement according to claim 1, wherein said at least one vehicle function comprises at least one of a vehicle antitheft system and a central vehicle locking system.

5. Arrangement according to claim 1, wherein said key/steering column lock communication channel comprises a transponder contained on said key unit, which transponder is coupled in communication with a detector on said steering column lock when said key unit is inserted therein.

6. Arrangement according to claim 1, wherein said key/vehicle communication channel comprises a transmitter unit arranged on said key unit, and a receiver unit arranged on said vehicle, and wherein said key/vehicle communication channel has a range which permits actuation thereof from outside said vehicle.

* * * * *